United States Patent Office 3,489,544
Patented Jan. 13, 1970

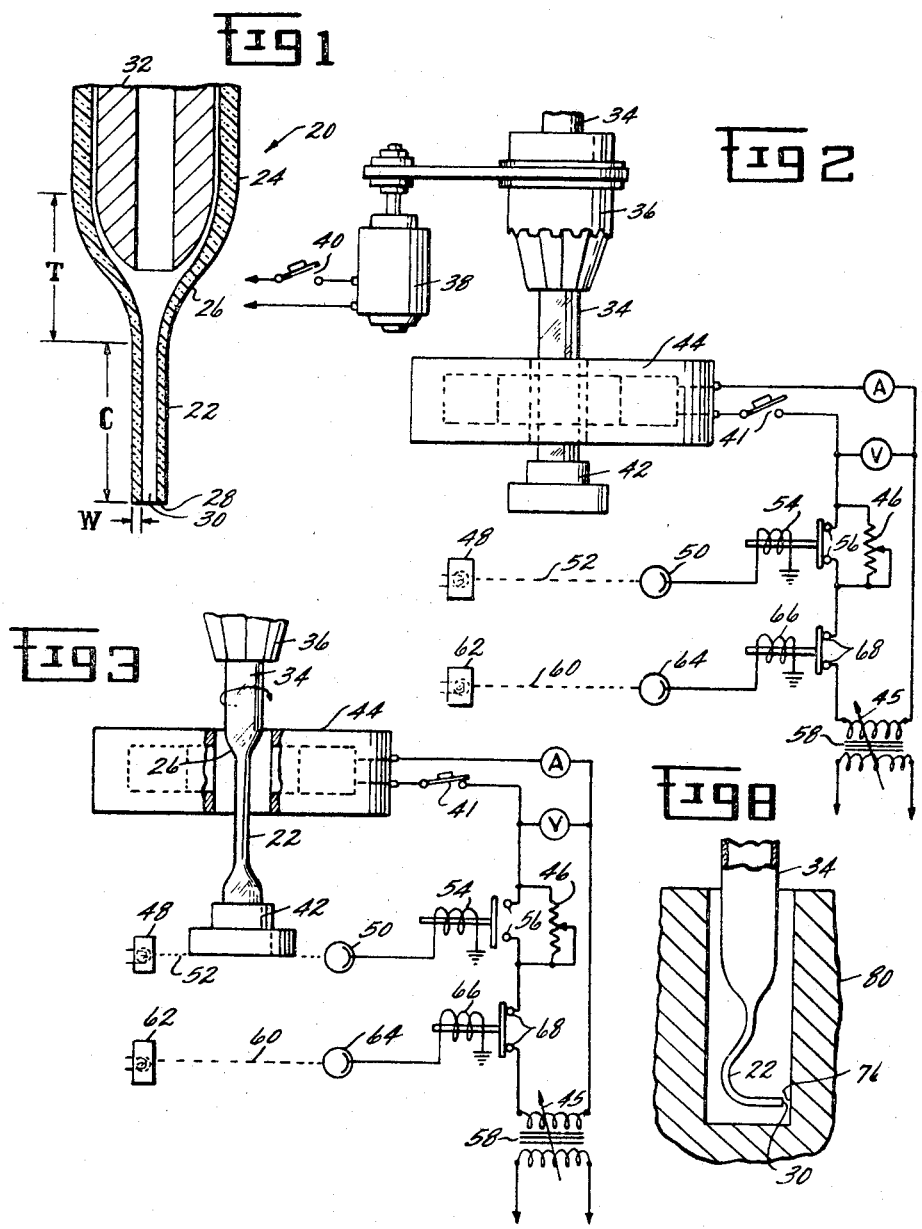

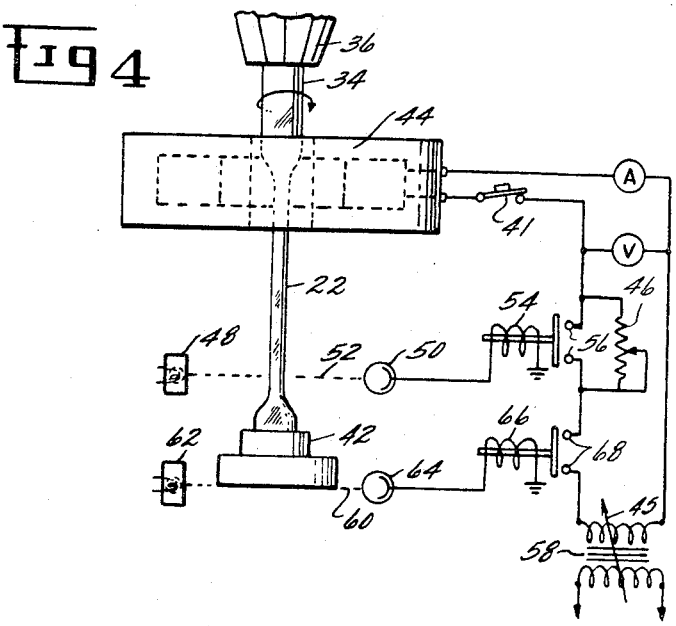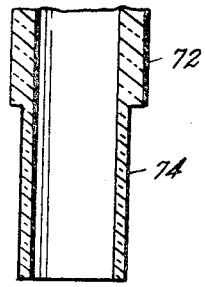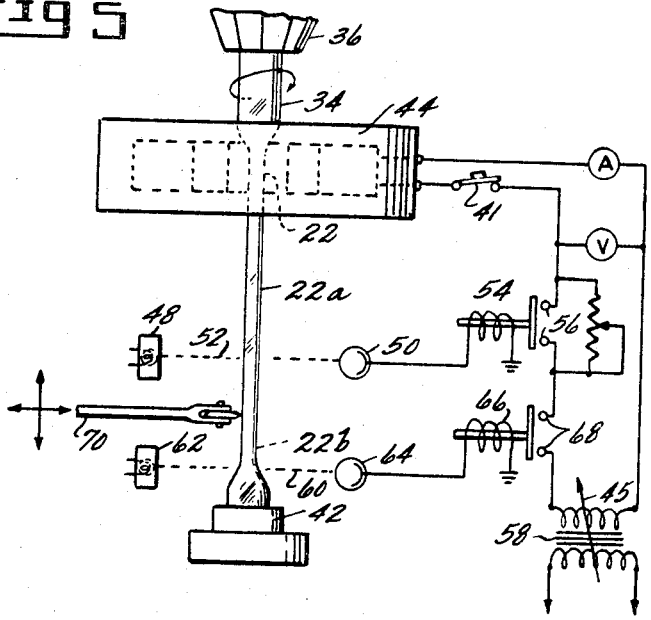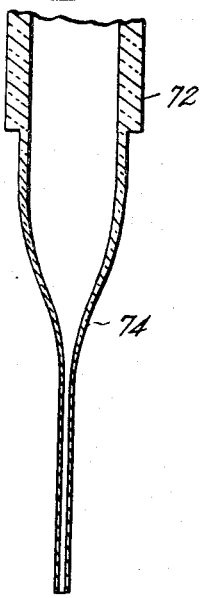

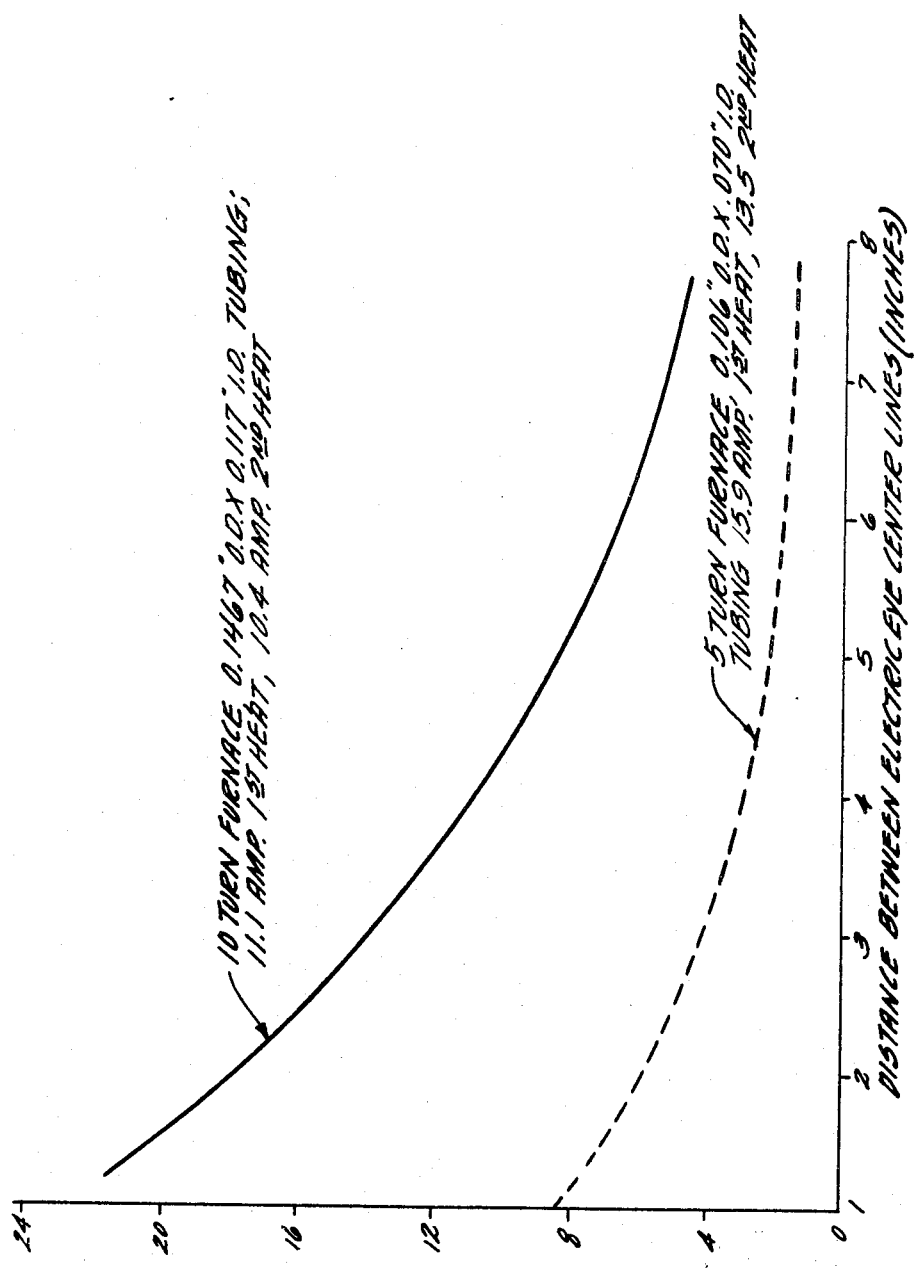

3,489,544
APPARATUS FOR MAKING AN ELECTROLYTE GUIDE MEMBER
James D. Andrews and Walter C. Kunz, Cincinnati, Ohio, assignors to General Electric Company, a corporation of New York
Original application Oct. 22, 1965, Ser. No. 501,643, now Patent No. 3,384,567, dated May 21, 1968. Divided and this application Feb. 19, 1968, Ser. No. 761,352
Int. Cl. C03b 23/08; G05b 13/02
U.S. Cl. 65—162                           2 Claims

ABSTRACT OF THE DISCLOSURE

Apparatus for drawing a portion of a hollow dielectric electrolyte guide member, for example, a glass nozzle, from a heat softenable circular tube includes three heat control switching means. The second and third of such means are responsive to tube length after the first switching means activates a heating means which heats the tube held under axial tension. The second switching means decreases heat whereas the third switching means deactivates the heating means. This combination controls the rate of drawing.

---

This is a divisional application of application Ser. No. 501,643 filed Oct. 22, 1965, now U.S. Patent 3,384,567 issued May 21, 1968, and assigned to the assignee of the present invention.

This invention relates to electrolytic material removal and, more particularly, to a guide member for directing electrolyte toward a workpiece and to a method and apparatus for making such member.

In general, the electrolytic material removal process involves a cathodic tool which cooperates with an anodic workpiece through an electrolyte contacting both the tool and the workpiece. As electric current is made to flow through the electrolyte, material is removed to "deplated" from the electrically conductive workpiece. One form of the electrolytic material removal process is more fully described in copending application Ser. No. 474,833, now Patent No. 3,403,084, filed July 26, 1965 and assigned to the assignee of the present invention. This method form involves projecting a continuous stream of cathodically charged electrolyte toward an anodic workpiece to remove relatively small, selected portions of the workpiece material. This form can be used to produce very small diameter cavities, slots or holes in a workpiece because the cathode which charges the electrolyte can be maintained external to the workpiece. Therefore, only the cathodically charged electrolyte need be guided appropriately toward the workpiece under proper conditions to allow electrolytic material removal to proceed.

The accurate control and dimensional repeatability in a workpiece or groups of workpieces of small dimensioned cavities such as holes of less than about 0.05" diameter, depends on the uniformity and accuracy of means used to guide or direct the charged electrolyte toward or into the workpiece. In one form, such an electrolyte guide means or member comprises a capillary tube made of an electrical non-conductor such as glass. The material is drawn or formed into a nozzle having a capillary end portion. Although the art of drawing, stretching or otherwise shaping of supercooled liquids such as glasses is well known and broadly reported upon, it was found that it was very difficult to control accurately the size, concentricity, dimensions and, in general, the overall quality of fine capillary glass tubes using known technology.

Therefore a principal object of this invention is to provide an improved method for producing accurate and uniform members to guide cathodically charged electrolyte toward an anodic workpiece for use in an electrolytic material removal process.

Another object is to provide an improved apparatus for producing such accurately dimensioned electrolyte guide members.

Still a further object is to provide an improved guide member having an outside diameter of less than about 0.06" and of specific shape and wall thickness to provide improved and efficient operation.

These and other objects and advantages will be more readily understood from the following detailed description and examples which are meant to be exemplary of rather than any limitation on the scope of this invention.

In the drawings:

FIG. 1 is a fragmentary sectional view of the electrolyte guide member in which a cathode has been placed;

FIG. 2 is a partially diagrammatic representation of the apparatus of the present invention prior to operation;

FIGS. 3 and 4 are views of a portion of the apparatus of FIG. 2 at various stages of operation;

FIG. 5 is a view of a modified form of the apparatus of FIG. 2 including means to cut the guide member to an appropriate length;

FIG. 6 is a fragmentary sectional view of a glass tube before drawing;

FIG. 7 is a fragmentary sectional view of a guide member drawn from the tube of FIG. 6;

FIG. 8 is a partially sectional view of a guide member particularly shaped for producing a side branch in an existing hole; and FIG. 9 is a graphical presentation of typical calibration data for two types of apparatus.

The electrolyte guide member of the present invention in one form is a dielectric hollow member having walls which define a small bore or capillary portion at one end terminating in a working tip. The capillary portion has a wall thickness of no more than about 0.0020" and is of a length sufficient to penetrate a desired distance into or through the workpiece. The capillary portion has an inside diameter sufficiently large to provide an electrolyte stream capable of producing the size cavity desired. Its outside diameter is selected to allow electrolyte to flow from the cavity being produced. If the outside diameter is greater than about 0.06", the process in which this member is used is less efficient than other material removal methods. However, when the wall thickness of such a capillary portion is greater than 0.0020", the metal removal rate is greatly reduced. A body portion of larger overall dimensions and which can act as an electrolyte reservoir joins the capillary portion through a transition section generally of varying wall thickness. The transition section together with the capillary portion are sometimes referred to in this specification as the nozzle. Thus the guide member includes a capillary portion of 0.06" or less outside diameter with the wall thickness of 0.0020" or less.

The starting material used in the improved method of making the guide member is a hollow tube of a dielectric material, such as a supercooled liquid which is solid at room temperature. The material most frequently used in the evaluation of this invention is a tube of a borosilicate type of glass. The tube is rotated while there is applied a tube stretching force, preferably of fixed magnitude, axially along the tube. The tube stretching force is less than that force which will produce plastic deformation in the tube at room temperature. As the force is applied, a selected portion of the tube is heated at a first heating rate to soften that portion sufficiently to allow the tube stretching force to elongate the tube to a first axial length. The elongation of the tube results in the formation of a necked-down or double nozzle area at the area of heat application between the ends of the tubes. After this first axial length has been reached, the selected portion of the tube can be heated at a second heating rate which is less than the first heating rate. The second heating rate slows the rate of elongation to more accurately control further lengthening of the reduced area portion of the tube. When a second axial length has been reached, which is greater than the first axial length, application of heat is terminated. The tube is continued to be rotated until the tube has cooled sufficiently to terminate elongation. Application of the tube stretching force is then stopped. A capillary portion thus produced between the two ends of the tube is joined with the remainder of the tube through a pair of transition sections, one on each end of the capillary portion. If only one of the transition sections or portions was heated, the transition sections will not be of the same shape. In such case, the one which joins that portion of the tube to which the tube stretching force was applied generally is less desirable. The capillary portion is cut at a selected point and the undesirable transition section and attached tube is then discarded. The remaining portion including a capillary end portion joined to the remainder of the tube through a transition portion is an eletrolyte guide guide member, the original tube end and the nozzle end of which can be trimmed further to a desired length.

The improved apparatus which can be used in the practice of the above method includes tube holding means, means to apply a tube stretching force to the tube, means to rotate the tube, sensing means to measure the length of the tube and heating means, responsive to the sensing means, capable of applying a plurality of heating conditions to a selected portion of the tube between the ends of the tube.

The improved electrolyte guide member, shown generally at 20 in FIG. 1 includes a capillary portion 22 joined with a body portion 24 larger in dimensions and internal volume by a transition section 26. Because in this example the capillary portion is made integral with the body portion in accordance with the method of this invention, the transition section is funnel-shaped. Capillary portion 22 includes working tip 28 the walls of which define an opening 30 from which charged electrolyte is emitted in a stream toward the workpiece. Within body portion 24 can be included a cathode 32 such as in the form of the metal tube shown in FIG. 1. The capillary portion 22 has a wall thickness W of 0.0020" or less. The capillary portion C is of a length sufficient to give direction to an electrolyte which is charged by passing over cathode 32 and is of sufficient length to penetrate a required distance into a workpiece or through a workpiece if such type of operation is planned. The transition section generally has an axial length T which is at least 0.15" in order to allow for a smooth transition from the body portion 24 to the capillary portion 22.

The method aspect of the present invention by which the electrolyte guide member of FIG. 1 is made, assures uniformity of wall thickness and the uniform circular cross section of the capillary portion. This controlled geometry assures repeatability of the size and shape of the cavity to be produced. Uniformity of guide members, one to the other, in the production of such articles as plates through which plastic filaments are drawn is significant to the quality of the final product.

In this method, and through the use of the apparatus shown in FIGS. 2, 3, 4 and 5, a tube 34 of a dielectric material such as glass is rotated by a rotatable tube holding means such as chuck 36 driven by motor 38. The rotation of motor 38 is initiated by switch 40 controlling the flow of power from a power source, not shown. As the tube is rotated, a tube stretching force of a magnitude less than that which will produce plastic deformation of the tube at room temperature is applied to one end of the tube 34 such as by weight 42 clamped to one end of the tube prior to the start of rotation.

A heating means such as a tube furnace 44 which in FIGS. 2–5 is hollow and through which the tube projects, is positioned to heat a selected portion of the tube from which the transition section 26 and capillary portion 22 shown in FIG. 1 are to be formed. Switch 41 initiates current flow to the furnace. The selected portion of the tube can be subjected to a variety of heating conditions through the use of variable transformer 45 controlling power to furnace 44. This controls elongation of the necked-down portions 22 in FIG. 3 which results from a combination of tube stretching force 42 and the heat applied from the heating means or furnace. The heating means 44 is responsive to the total amount of elongation of tube 34. For example, as weight 42 passes between light source 48 and photosensitive element 50, which together form an electric eye mechanism, light beam 52 is broken. This interrupts the flow of electrical current to solenoid 54 which is arranged or biased to withdraw from contact points 56, causing the current passing through transformer 58 to flow through that portion of the circuit including variable resistance 46. In this way the heat applied to tube at 22 by heating means or furnace 44 is reduced or controlled further.

After the reduction in heat application as shown in FIG. 3, tube 34 continues to elongate in capillary portion 22 and transition section 26. However, the elongation is at a slower rate because resistance 46 reduces the rate of heat applied by means or furnace 44. Elongation continues until a second light beam 50 shown in FIG. 3 between elements 62 and 64 of a second electric eye is broken as shown in FIG. 4. This causes solenoid 66 to break contact with connection 68 turning off heating means 44. Rotating capillary portion 22 in FIG. 5 continues to elongate until its temperature falls below that point at which tube stretching force or weight 42 no longer can produce plastic deformation of the tube material. If desired, the capillary portion 22 can then be cut while still held in rotating chuck 36 by a cutting means such as a glass scoring tool mounted in a holder 70. This separates portion 22a from 22b. Portion 22b and its attached transition and tube portion is then discarded and portion 22a with its associated transition and tube portion is removed from the holding means 36. Portion 22a which is the electrolyte guide member of the present invention, can be further sized as desired for use. By adjusting the amount and duration of heat applied for each selected tube size, the dimensions of electrolyte guide members can be closely controlled.

The accurate use of the apparatus shown in FIGS. 2 through 5 depends on the apparatus being calibrated for each size tubing used. Calibration includes understanding results from variation in conditions such as furnace temperature, furnace size, spacing between electric eye centers which controls heating rates, tube stretching force, and the like. A summary of typical calibration data for two sets of conditions tested is shown in FIG. 9. In the particular calibrations from which the data of FIG. 9 was obtained, a weight of 0.05 pound to act as a tube stretching force was secured to the tubing at a point $3/16$" above the upper electric eye centerline shown as 52 in the drawing. The tube was rotated at a speed of about 10 r.p.m. under the conditions listed in FIG. 9.

From the data of FIG. 9, it can be seen that once the apparatus is calibrated, an operator can determine the type of operating conditions best suited to make a guide member of a desired size. For example, the appartaus and conditions producing the curve shown in solid in FIG. 9 are more suitable for the manufacture of larger diameter guide members whereas those producing the broken line curve in FIG. 9 are more suitable for manufacturing smaller diameter guide members. Note how the broken line curve tends to flatten out after the distance between electric eye centerlines is arranged at about 5" or more.

EXAMPLE 1

In one typical statistical evaluation of the quality and reproducibility of guide members, 82 of such members were made and studied. The tubing used was 0.1197" O.D. x 0.083" I.D. Kimble KG 33 borosilicate glass having a strain or softening point of 515° C. The aim was to produce a capillary portion in the range of 0.0054" ±0.0002" I.D. with a wall thickness of 0.0020" or less. Using the method and apparatus of the present invention, all of the 82 members were within these limits. From a statistical or quality control viewpoint this is within six sigma limits which means that in at least 99.7% of the cases, the member will fall within the desired limits. The furnace used in this example was a tube furnace heated by 5 turns of #18 B & S gage uncovered Ni-Cr wire. The first heating rate was for 1 min. 20 sec. at 15.7 amps and the second heating rate was 22 seconds at 13.5 amps. The voltage was 10 volts and the tube was rotating at 10 r.p.m.

As was mentioned above, a critical feature of the guide member of the present invention is that the wall thickness shown as W in FIG. 1 is maintained at 0.0020" or less. The walls of the capillary portion 22 of the guide member are required to direct a stream of charged electrolyte from a cathode 32 through opening 30 in working tip 28 toward the workpiece. As the working tip penetrates the surface of the workpiece, the walls of the capillary portion become an obstruction to the flow of electrolyte out of the cavity being produced. Therefore, the rate at which the electrolyte guide member is fed toward and into the workpiece depends upon the rate at which the cavity is being produced to allow electrolyte to flow into and out of the cavity in the workpiece. It has been recognized unexpectedly that if the wall thickness of the capillary portion is greater than about 0.0020" the feed rate must be reduced by about half in order to produce a desired cavity. The following example will more clearly illustrate this unusual occurrence.

EXAMPLE 2

A nickel base superalloy having a nominal composition, by weight, of 15% Cr; 3.25% Ti; 0.025% B; 4.25% Al; 17% Co; 5% Mo; 0.015% (max.) C with the balance nickel and incidental impurities was used as a workpiece in an electrolytic material removal process through which it was desired to produce a hole having a diameter of about 0.033". An electrolyte guide member of the type shown in FIG. 1 was made so that the capillary portion 23 had a length C of 0.600" with an opening diameter 30 of 0.020" and a wall thickness of 0.0025". With the working tip 28 maintained at a distance of 0.014" from the workpiece surface and with a potential of 600 volts, a current of 1.2 amps was made to pass through an electrolyte. The electrolyte, which was under a pressure of 50 p.s.i.g. was an aqueous solution of sulfuric acid at a concentration of 172 grams per liter. The maximum allowable rate at which the guide member could be fed toward the workpiece without contacting the workpiece was 0.080", per minute. Under these same conditions, using a capillary portion 22 having a wall thickness reduced from 0.0025" to 0.0020" with the other dimensions unchanged, a feed rate of 0.120" per minute was allowable to produce the same size hole. Thus reduction in the wall thickness to 0.0020" from 0.0025" resulted in a substantial increase in metal removal rate as evidenced by the increase in maximum allowable feed rate from 0.080" to 0.120" per minute.

In the evaluation of the present invention, it has been found that the ratio of the inside diameter to the outside diameter in the capillary portion of the tube 22 of the nozzle closely approximates the ratio of the inside diameter to the outside diameter of the raw tubing. This similarity makes it possible to predict the wall thickness in the drawing portion of the nozzle for a given tube size. Tubing of a particular outside diameter can be preselected or can be prepared such as by centerless grinding to produce a given wall thickness in the finished capillary portion. Thus in order to prepare an electrolyte guide member having a particular wall thickness and of a particular size, raw tubing as shown at 72 in FIG. 6 can be ground or otherwise reduced in outside diameter at a portion 74 so that a guide member as shown in FIG. 7 of a selected wall thickness and size can be produced according to the method of the present invention.

The guide member of the present invention can be used to produce cavities or holes through the side wall of larger holes or depressions in a workpiece such as is shown in FIG. 8 by bending the capillary portion of the guide member to direct the working tip 30 of the capillary portion 22 at a side wall 76 of workpiece 80.

Although the present invention has been described in connection with some specific examples and conditions, it will be recognized by those skilled in the art the variations and modifications of which the present invention is capable.

What is claimed is:

1. Apparatus for making an electrolyte guide member from a circular tube of a dielectric material which is solid at room temperature but which can be made to flow at a higher temperature, the apparatus comprising:
    a rotatable tube holding means which holds the tube so that it projects from and moves with the holding means;
    means to rotate the holding means;
    heating means to apply heat to a portion of the tube projecting from the holding means;
    heat control means for adjusting the rate of application of said heating means;
    means to apply a tube stretching force axially along the tube in a direction away from the holding means at a point on the tube at which the heating means its between the tube holding means and the means to apply the force, the tube stretching force being less than that force which will produce plastic deformation in the tube at room temperature;
    first switching means to activate the heating means to apply heat at a first heating rate sufficient to allow the tube stretching force to elongate the tube to a first intermediate length greater than the starting length;
    second switching means for sensing an intermediate length of the tube and adjusting the heat control means to a lower heat application to allow the tube stretching force to elongate the tube at a slower rate of elongation than the first rate of elongation;
    third switching means sensing a further predetermined elongation to deactivate the heating means.

2. The apparatus of claim 1 in which:
    the rotatable holding means holds the tube so that it projects vertically downward through the heating means,
    the heating means being a tubular furnace through which the tube projects.

References Cited

UNITED STATES PATENTS 3,091,105   5/1963   Morrill _____ 65—110 X
3,114,621   12/1963   Kiraly _____ 65—272

ARTHUR D. KELLOGG, Primary Examiner

U.S. Cl. X.R.
65—109, 163, 272